June 26, 1945.   F. M. FRAGA   2,379,225
HITCH
Filed May 1, 1944   3 Sheets-Sheet 3
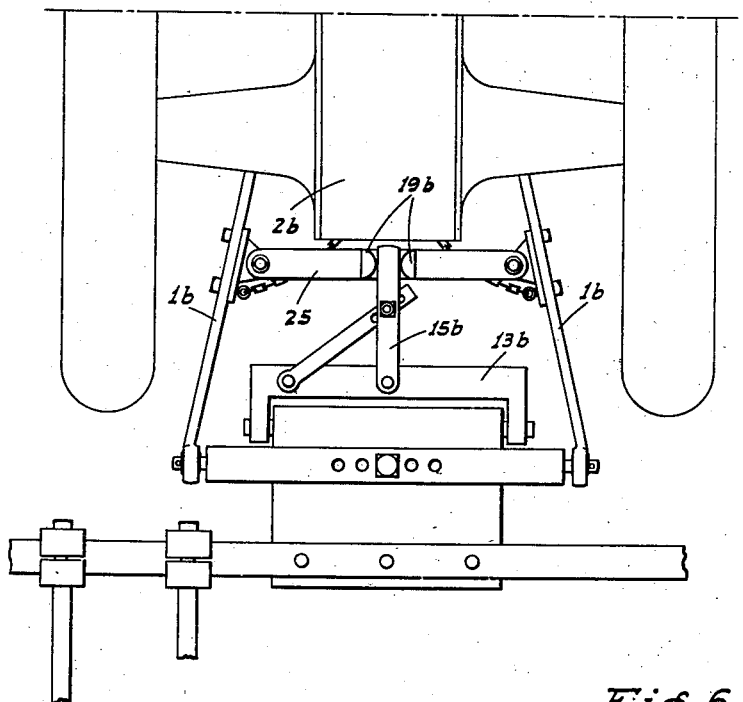
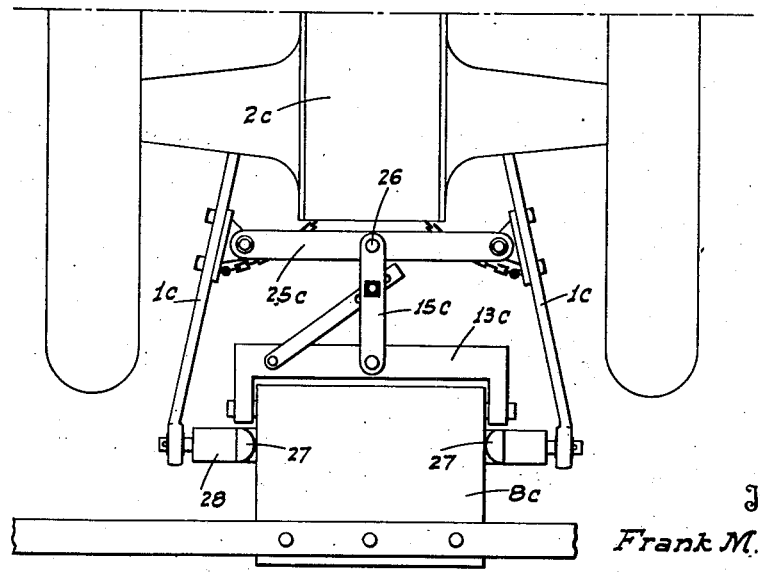
Inventor
Frank M. Fraga
By Webster & Webster
Attorneys Patented June 26, 1945

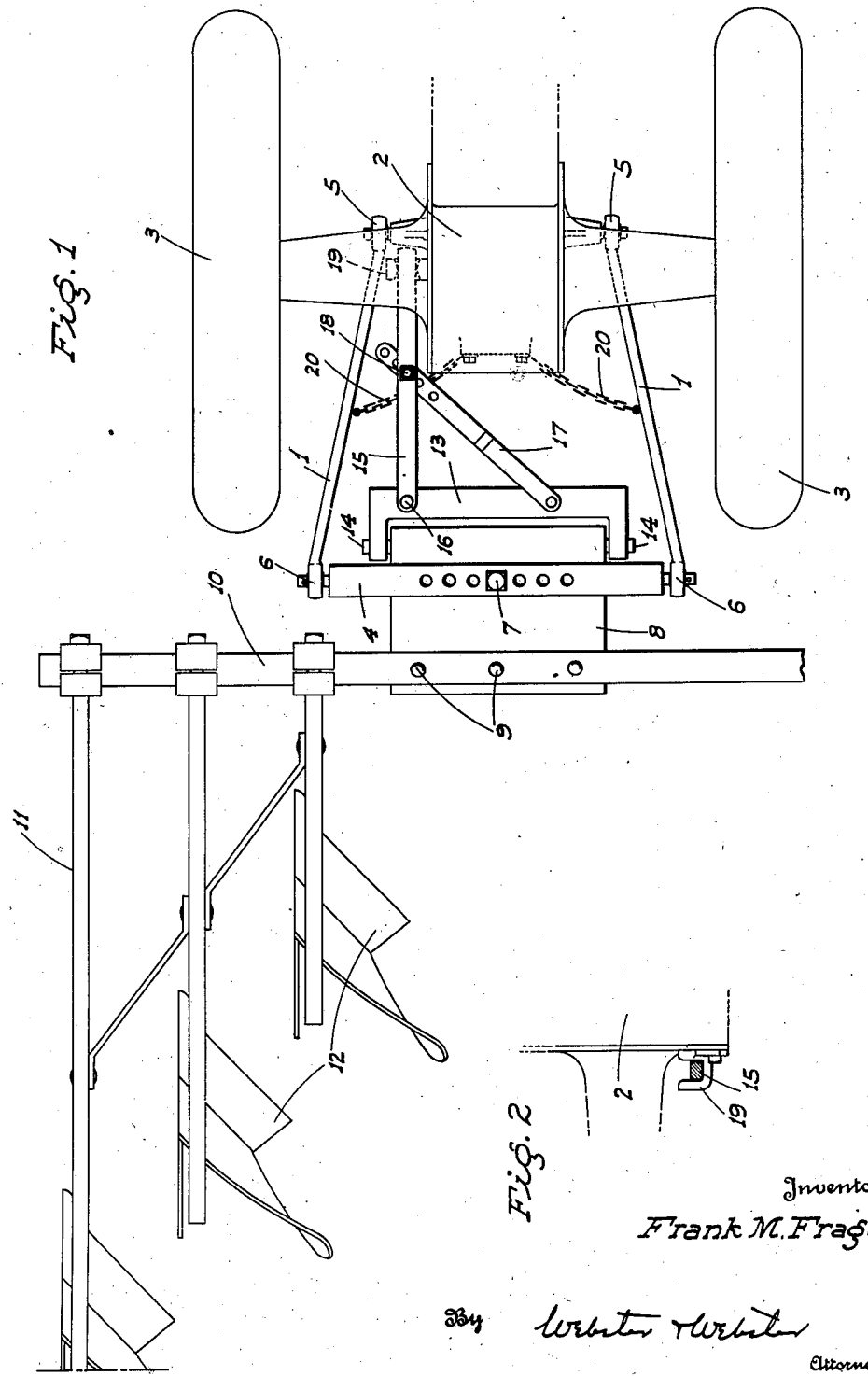

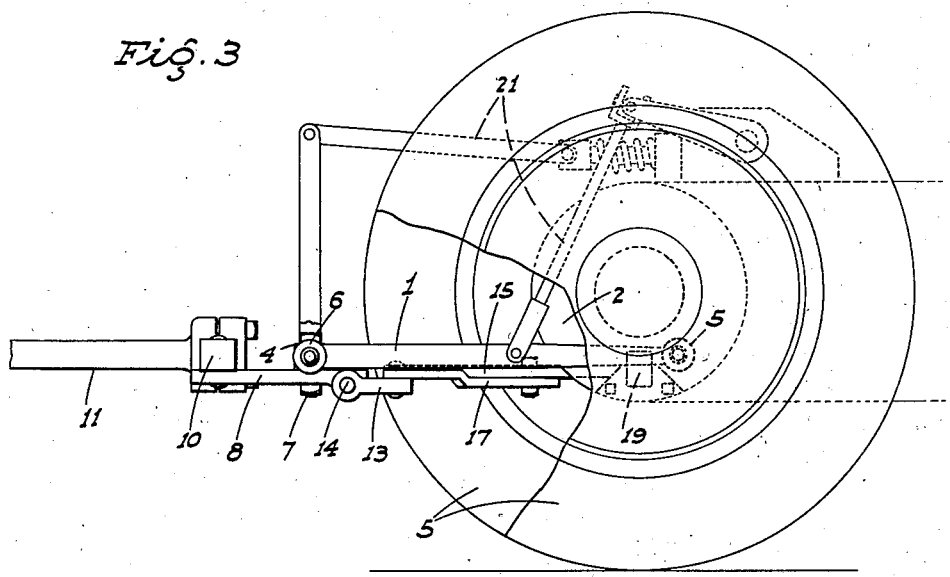
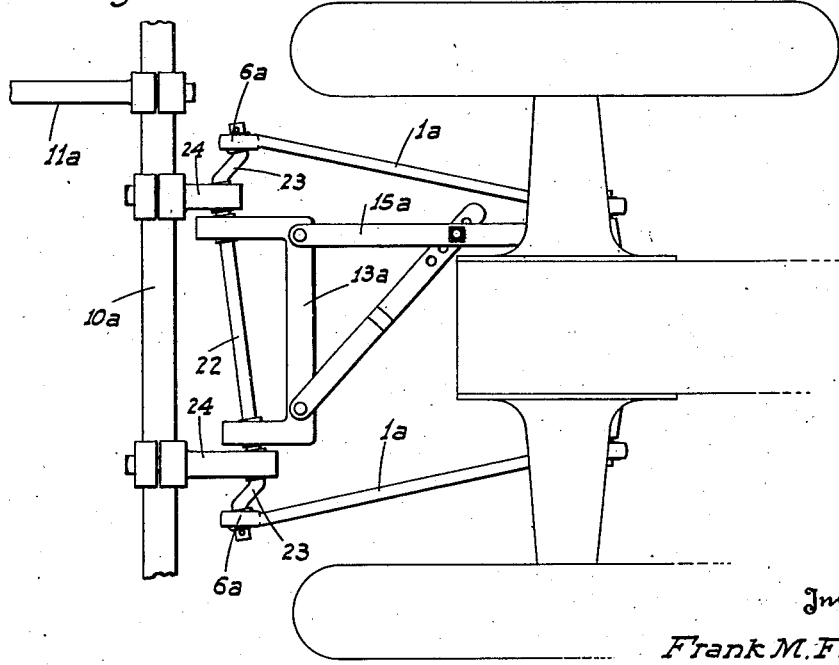

2,379,225

UNITED STATES PATENT OFFICE 2,379,225

HITCH

Frank M. Fraga, Fresno, Calif.

Application May 1, 1944, Serial No. 533,552

12 Claims. (Cl. 280—33.44)

This invention relates to, and it is an object to provide, an improved hitch arranged to connect an initially separate earth working implement with a tractor in draft relation; the hitch being especially designed for use to connect earth working implements to tractors of the Ford-Ferguson type.

A further object of this invention is to provide a hitch, as above, which is constructed so that the side draft of an implement, such as an offset plow or the like, is imparted to the tractor in a manner and at such a point that it does not produce an undesirable reaction in movement of the tractor, and the latter steers neutral, i. e. it is not necessary to compensate, by steering, for the side draft of such implement.

Another object of this invention is to provide a hitch which is constructed so that the pull or load of an offset type implement is substantially equally distributed to the rear wheels of the tractor.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of one form of the hitch as connected between a tractor and an offset plow.

Figure 2 is a fragmentary elevation of the thrust tongue receiving cradle as mounted on one side of the tractor differential housing.

Figure 3 is a side elevation of the form of hitch shown in Fig. 1.

Figure 4 is a plan view of a modified form of hitch.

Fig. 5 is a plan view of another form of the hitch.

Fig. 6 is a plan view of a further embodiment of the hitch.

Referring now more particularly to the characters of reference on the drawings, and particularly at present to Figs. 1-3 inclusive, this form of the hitch comprises a pair of draft links 1 which connect at their forward ends to the sides of the tractor differential housing 2 at opposite sides of the latter and slightly ahead of the axis of the rear tractor wheels 3. The draft links 1 diverge rearwardly and at their rear ends are connected to corresponding ends of a relatively long, transversely extending drawbar 4. The connection between the ends of the draft links 1 and the differential housing and drawbar 4 comprise flexible ball and socket couplings, indicated generally at 5 and 6, respectively.

Intermediate its ends the drawbar is adjustably connected by a vertical draft bolt 7 with a substantially horizontal plate 8 which projects on both sides of the drawbar 4 lengthwise of the tractor.

Rearwardly of the drawbar 4 the plate 8 is fixedly connected, as at 9, with the transverse tool bar 10 of an offset plow 11, which includes plow shares 12 disposed to one side of the longitudinal center line of the tractor.

Ahead of the drawbar 4 the plate 8 is fitted with a vertically swingable, forwardly projecting yoke 13 which is generally U-shape in plan; said yoke being carried at its ends on pivot pins 14 which are fixed in connection with said plate.

A rigid thrust tongue 15 is pivotally connected at its rear end, as at 16, to the yoke 13 adjacent one end of the latter, and said tongue projects forwardly in substantially horizontal relation from said yoke. The tongue 15 is held in a selected position of adjustment by means of an adjustable diagonal brace 17 which extends from the yoke adjacent its other end to connection as at 18 with the tongue intermediate its ends. Adjacent its forward end the thrust tongue 15 slidably and rockably seats in an upwardly opening, fixed cradle 19 secured on the corresponding side of the differential housing 2.

It will be seen that such cradle will permit vertical rocking of the tongue 15, as well as longitudinal sliding movement thereof.

Normally slack limit chains 20 connect between the differential housing and the draft links 1 intermediate the ends of the latter.

In operation the above described hitch functions as follows:

The offset plow 11, as it is moved forwardly by the tractor, produces a side draft which tends to rotate the plate 8 about the draft bolt 7. When this occurs such rotative tendency transmits the side draft of the plow to the thrust tongue 15 as a lateral force, which is applied to the cradle 10 and consequently to the tractor at a point in substantially the transverse plane of its rear axle. Thus, the side draft of the offset plow 11 cannot swing the tractor to one side or the other about the rear wheels as a pivot point, and the tractor steers normally.

When the above described hitch is employed in connection with a tractor of the Ford-Ferguson type, the lifting link and depth control mechanism of the latter, as indicated generally at 21, may be connected to the hitch in the manner shown in Fig. 3.

In the modified form of hitch, as shown, in Fig. 4, the general assembly remains the same, but in place of the drawbar 4 and plate 8, as in the embodiment of Fig. 1, I here use the following arrangement:

A crankshaft 22, which includes opposed end cranks 23, is disposed so that the crank pins of said end cranks are alined transversely of the direction of travel, and said cranks are rotatably engaged with the adjacent ends of the draft links 1a by means of flexible ball and socket units 6a.

To position the cranks as above the crankshaft 23 is angled in a horizontal plane as shown. Between the cranks said crankshaft is journaled through the legs of yoke 13a and through corresponding and adjacent bearing brackets 24 which project forwardly from the tool bar 10a.

When this embodiment of the invention is in use, the side draft of the implement is converted by the crankshaft, crank, and yoke assembly into lateral thrust in the thrust tongue 15a, which thrust is in turn applied laterally to the tractor, through the tongue receiving cradle, in a transverse vertical plane adjacent the axis of the rear wheels of the tractor. With the thrust so applied to the tractor, operation and steering of the latter remains normal.

The form of the hitch shown in Fig. 5 is similar in assembly to the structure shown in Fig. 1, except that here the thrust tongue 15b projects forwardly from the yoke 13b centrally of its ends and substantially at the longitudinal center line of the tractor. The thrust cradle 19b, shown in Fig. 1 at 19, on the differential housing, is applied in this case to a rigid cross bar 25 pivotally connected at its ends to corresponding ones of the draft links 1b as close to the differential housing 2b as is practical. When this form of the hitch is in use the side draft of the implement is transmitted, as before, to the thrust tongue 15b. With this arrangement, however, the thrust from said tongue is imparted to the tractor adjacent its rear axle through the medium of the cradle 19b, cross bar 25, and the forward end portions of draft links 1b.

In the embodiment of Fig. 6, the thrust tongue 15c is likewise centrally disposed but is pivoted, as at 26, to the rigid cross bar 25c which pivotally connects, adjacent differential housing 2c, between the draft links 1c. The yoke 13c is pivotally mounted on a plate 8c, as in Fig. 1, but in this arrangement said plate longitudinally slidably engages in a cradle 27 formed on another rigid cross bar 28 pivotally connected between the rear ends of draft links 1c. When this embodiment is in use, the pivot 26 becomes the point of draft, while the side thrust of the implement is imparted from plate 8c through cradle 27 and bar 28 to the links 1c and thence to the tractor axle.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A hitch adapted for connection between a tractor and a trailing implement, comprising a draft assembly adapted to connect at its forward end to the tractor at transversely spaced points and to connect at its rear end rigidly to the implement, said draft assembly including a rigid forwardly projecting thrust tongue and relatively movable elements operative to convert side draft of the implement into lateral thrust of said tongue, and means on the tractor engaged by said tongue to transmit said thrust to the tractor independently of the transversely spaced points of connection between said assembly and said tractor; said relatively movable elements including a member fixed on and projecting forwardly from the implement, said member being pivotally connected in the draft assembly for relative lateral swinging movement and the tongue being fixed on and projecting forwardly from said member.

2. A hitch adapted for connection between a tractor and a trailing implement, comprising a pair of rigid, rearwardly projecting draft links connected to the tractor adjacent the rear at transversely spaced points, a transverse drawbar connecting the draft links adjacent their rear end, a member fixed on and projecting forwardly from the implement in intersecting relation to said drawbar, means pivotally connecting the member to the drawbar for relative lateral swinging movement, a forwardly projecting thrust tongue secured in connection with said member and laterally fixed relative to the same, and means on the tractor engaged by said tongue and holding the latter against lateral movement adjacent its forward end.

3. A hitch adapted for connection between a tractor and a trailing implement, comprising a pair of rigid, rearwardly projecting draft links connected to the tractor adjacent the rear at transversely spaced points, a transverse drawbar connecting the draft links adjacent their rear end, a member fixed on and projecting forwardly from the implement in intersecting relation to said drawbar, means pivotally connecting the member to the drawbar for relative lateral swinging movement, a forwardly projecting thrust tongue secured in connection with said member and laterally fixed relative to the same, and means on the tractor engaged by said tongue and holding the latter against lateral movement adjacent its forward end; said last named means comprising a cradle open lengthwise of the tractor, in which the tongue rests.

4. A hitch as in claim 2 in which said last named means is disposed adjacent the vertical plane of the rear axle of the tractor.

5. A hitch as in claim 2 in which the tractor includes a rear axle and differential housing assembly, and said last named means being a cradle being fixed to said differential housing assembly.

6. A hitch adapted for connection between a tractor and a trailing implement, comprising a pair of rigid, rearwardly projecting draft links connected to the tractor adjacent the rear at transversely spaced points, a transverse drawbar connecting the draft links adjacent their rear end, a member fixed on and projecting forwardly from the implement in intersecting relation to said drawbar, means pivotally connecting the member to the drawbar for relative lateral swinging movement, a yoke connected to the member ahead of the drawbar in vertically swingable but laterally immovable relation, a thrust tongue fixed in connection with and projecting forwardly from the yoke, and a cradle open lengthwise of and mounted on the tractor, said tongue slidably engaging in said cradle.

7. A hitch adapted for connection between a wheel tractor having a rear axle and differential housing, and an implement including a transverse tool bar, said hitch comprising a pair of rigid, rearwardly projecting draft links connected at their forward ends to said housing at transversely spaced points, a transverse drawbar connecting the draft links at their rear end, a plate fixed on said tool bar and projecting across the drawbar, a vertical pivot connecting the plate and drawbar, a U-shaped yoke straddling the plate ahead of the drawbar, the legs of said yoke being connected to the plate by transversely extending pivots, a thrust tongue fixed in connection with the yoke and projecting forwardly, and a cradle open lengthwise of the tractor mounted on said housing, the tongue slidably engaging in the cradle.

8. A hitch adapted for connection between a tractor and a trailing implement, comprising a pair of rigid, rearwardly projecting draft links connected to the tractor adjacent the rear at transversely spaced points, a transverse drawbar connecting the draft links adjacent their rear end, a member fixed on and projecting forwardly from the implement in intersecting relation to said drawbar, means pivotally connecting the member to the drawbar for relative lateral swinging movement, a forwardly projecting thrust tongue secured in connection with said member and laterally fixed relative to the same, a rigid cross bar connected between said draft links adjacent their forward ends, and a cradle fixed on said cross bar intermediate its ends, said cradle being open lengthwise of the tractor and the thrust tongue resting in said cradle in longitudinally slidable relation.

9. A hitch as in claim 8 in which said tongue and cradle are disposed substantially at the longitudinal center line of the implement.

10. A hitch adapted for connection between a tractor and a trailing implement, comprising a pair of rigid, rearwardly projecting draft links connected to the tractor adjacent the rear at transversely spaced points, a cross bar connecting said draft links adjacent the rear ends of the latter, a cradle formed on said cross bar intermediate its ends, said cradle being open lengthwise of the tractor, a member fixed on and projecting forwardly from the implement, said member resting in said cradle in longitudinally slidable relation, a tongue fixed in connection with said member and projecting forwardly therefrom, another cross bar connected between said draft links adjacent their forward ends, and means pivotally connecting said tongue at its forward end to said other cross bar intermediate the ends of the latter.

11. A hitch adapted for connection between a tractor and a trailing implement, comprising a pair of rigid, rearwardly projecting draft links connected to the tractor adjacent the rear at transversely spaced points, a cross bar connecting said draft links adjacent the rear ends of the latter, a cradle formed on said cross bar intermediate its ends, said cradle being open lengthwise of the tractor, a member fixed on and projecting forwardly from the implement, said member resting in said cradle in longitudinally slidable relation, a tongue fixed in connection with said member and projecting forwardly therefrom, another cross bar connected between said draft links adjacent their forward ends, and means pivotally connecting said tongue at its forward end to said other cross bar intermediate the ends of the latter; the tongue being fixed in connection with said member by means of a yoke to which the tongue is rigidly attached, said yoke being connected to said member in relatively vertically swingable laterally immovable relation.

12. A hitch adapted for connection between a tractor and a trailing implement, comprising a pair of rigid, rearwardly projecting draft links connected to the tractor adjacent the rear at transversely spaced points, a transverse drawbar connecting the draft links adjacent their rear end, a member fixed on and projecting forwardly from the implement in intersecting relation to said drawbar, means mounting the member on the drawbar for relative lateral swinging movement, a yoke connected to the member ahead of the drawbar in vertically swingable but laterally immovable relation, a thrust tongue fixed in connection with and projecting forwardly from the yoke, and means to transmit lateral thrust of said tongue to the tractor adjacent its rear end.

FRANK M. FRAGA.